United States Patent
Mahdavi

(10) Patent No.: US 8,578,150 B2
(45) Date of Patent: Nov. 5, 2013

(54) CONTACT INFORMATION RETRIEVAL SYSTEM AND COMMUNICATION SYSTEM USING THE CONTRACT INFORMATION RETRIEVAL SYSTEM

(75) Inventor: Khashayar Mahdavi, Geneva (CH)

(73) Assignee: Telnic Limited, London (GB)

( * ) Notice: Subject to any disclaimer, the term of this patent is extended or adjusted under 35 U.S.C. 154(b) by 1434 days.

(21) Appl. No.: 11/769,468

(22) Filed: Jun. 27, 2007

(65) Prior Publication Data

US 2008/0288774 A1 Nov. 20, 2008

(30) Foreign Application Priority Data

May 16, 2007 (EP) .................................... 07252005

(51) Int. Cl.
*H04L 29/06* (2006.01)
(52) U.S. Cl.
USPC ................................ 713/155; 713/182; 726/2
(58) Field of Classification Search
USPC ............................................. 726/3; 713/155
See application file for complete search history.

(56) References Cited

U.S. PATENT DOCUMENTS

| | | | |
|---|---|---|---|
| 6,510,513 B1 * | 1/2003 | Danieli | 713/156 |
| 7,624,421 B2 * | 11/2009 | Ozzie et al. | 726/1 |
| 2003/0050920 A1 * | 3/2003 | Sun | 707/2 |
| 2006/0059337 A1 * | 3/2006 | Poyhonen et al. | 713/165 |
| 2008/0016233 A1 * | 1/2008 | Schneider | 709/230 |

FOREIGN PATENT DOCUMENTS

| | | |
|---|---|---|
| EP | 1 619 867 A2 | 1/2006 |
| WO | 2006/030296 A1 | 3/2006 |

OTHER PUBLICATIONS

Cryptography and Network Security, Fourth Edition, William Stallings, 2006.*

* cited by examiner

Primary Examiner — Mohammad L Rahman
(74) Attorney, Agent, or Firm — Fish & Richardson P.C.

(57) ABSTRACT

There is described a communication system allowing communication over one or more communication networks. The communication system includes a domain name server storing a zone data file for a domain associated with a first party, the zone data file including contact information associated with the first party, the contact information including a plurality of electronic communication identifiers associated with the first party with each electronic communication identifier being associated with a corresponding communication protocol. An access granting system enables the first party to grant a second party access to one or more of the plurality of electronic communication identifiers. In particular, the access granting system encrypts one or more electronic communication identifiers to generate encrypted contact information, stores the encrypted contact information in the zone data file in association with a sub-domain of the domain associated with the first party, and provides the second party with access to the identity of said sub-domain.

7 Claims, 12 Drawing Sheets

CONTACT INFORMATION RETRIEVAL SYSTEM AND COMMUNICATION SYSTEM USING THE CONTRACT INFORMATION RETRIEVAL SYSTEM

This application claims the right to priority under 35 U.S.C. §119 based on European Patent Application Number 07252005.9 filed on 16 May 2007, which is hereby incorporated by reference herein in its entirety as if fully set forth herein.

FIELD OF THE INVENTION

This invention relates to a networked system enabling a first party to look-up contact information associated with a second party. The contact information may include one or more electronic communication identifiers associated with the second party. The invention extends to various novel components of the networked system, and methods of operation of the system and the novel components.

BACKGROUND OF THE INVENTION

The Internet provides an extensive communication network infrastructure allowing the communication of data from a first network location to a second network location. Many different types of communication are possible over the Internet, for example various forms of Voice over IP (VoIP) service, email services and web browser services. In addition, interfaces between the Internet and conventional PSTN telephone networks are becoming increasing prevalent. Each form of communication relies on an associated electronic communications identifier for initiating communication or accessing services. Such an electronic communication identifier acts as a destination name by which a device used by a person can initiate communication. As such any person, whether a real person or a legal entity such as a corporation, may have many different associated electronic communication identifiers. When published electronically, these electronic communication identifiers are each held in a form called a Universal Resource Identifier or URI.

Recently, ICANN approved an application by Telnic Limited, a company incorporated under the law of England and Wales, for a new sponsored Top Level Domain (TLD), that is the .Tel domain. The new .Tel domain facilitates publication of contact information associated with the domain owner. In particular, a domain owner can arrange for publication of electronic communication identifiers within the Domain Name System (DNS). In response to a query asking for a list of contacts associated with a domain name, the system returns a set of Uniform Resource Identifiers that the owner of the domain has chosen for publication. Those querying users can see this text-based electronic communication identifier information associated with the owner of the .Tel domain, and can initiate electronic communications using those identifiers corresponding to whatever communication facilities they have available.

An object of the present invention is to provide a mechanism by which access to at least some electronic communication identifiers may be controlled by a domain owner. In other words, a person (whether real or legal) associated with a domain is able to control which electronic communication identifiers are provided based on the identity of the person making the query. In this way, for example, the owner of a .Tel domain can restrict the dissemination of an email address (in a usable form) in order to reduce the number of unwanted messages, commonly referred to as spam messages, received at that email address.

SUMMARY OF THE INVENTION

According to an aspect of the invention, there is provided a network communication system in which contact information for a first party is stored in a DNS zone datafile. The contact information includes a plurality of electronic communication identifiers associated with the first party, each such identifier being associated with a corresponding communications protocol. Preferably, these contacts are each published in the form of a Universal Resource Identifier. At least some of the electronic communication identifiers are not available from the database in a plain format. These data are instead published in an encrypted format provided to anyone, but in this form are not usable without the knowledge of the mechanism needed to decode them. A communication system enables the first party to grant a second party access to one or more of the plurality of protected electronic communication identifiers by storing encrypted contact information (including the one or more electronic communication identifiers and ensuring the second party has access to the cryptographic key needed to decrypt this encrypted contact information. The second party is then able to access and decrypt the encrypted contact information to recover the protected electronic communication identifiers. The second party may then initiate communication with the first party using one of the recovered electronic communication identifiers associated with the first party.

In an embodiment of the invention, there are three sets of devices involved, in this system:

a sponsoring organisation (SO) system allocates identities, and stores and publishes associated cryptographic keys in DNS (in domains tied to the entities) for use with signature validation and encryption;

a name service provider (NSP) PS creates and publishes encrypted copies of protected data in dedicated sub-domains at the behest of the domain owner; and client devices store the counterpart of the cryptographic key published in the SO for the identity the client uses, generate and process messages, and use private knowledge to decode copies of protected data for their users.

In particular, these devices sign messages and then encrypt these for the intended recipient, and decrypt data, validate signatures over incoming messages, and decode encrypted copies of data published for their consumption by domain owners.

BRIEF DESCRIPTION OF THE DRAWINGS

An embodiment of the present invention will now be described in detail with reference to the attached Figures in which.

DETAILED DESCRIPTION

System Overview

Figure 1:
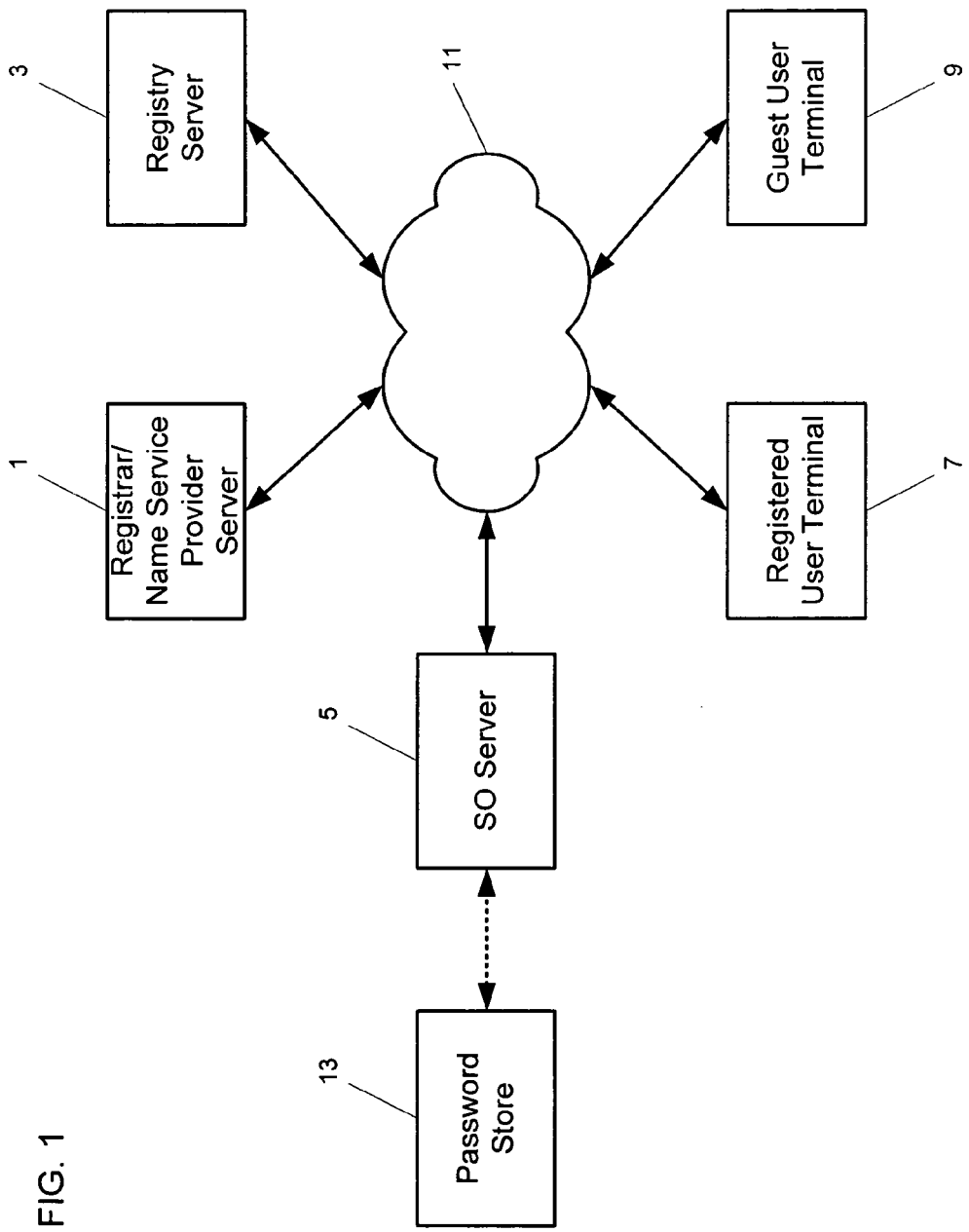
FIG. 1 schematically shows the main components of a communication system according to the present invention.

As schematically shown in FIG. 1, the network communication system of the present invention involves a Registrar/Name Service Provider server 1 (hereafter referred to as the NSP server 1), a registry server 3, a sponsoring organisation server 5 (hereafter called the SO server 5), registered user terminals 7 (only one of which is shown in FIG. 1 for ease of illustration) and guest user terminals 9 (only one of which is shown in FIG. 1 for ease of illustration) all interconnected via the Internet 11. A password server 13 is associated with the SO server 5.

The registry 3 is a conventional DNS registry which maintains a top-level domain. In this embodiment, the registry 3 maintains a sponsored top level domain, in particular the .Tel top-level domain. The registry 3 delegates responsibility for the maintenance of various zones associated with the .Tel domain to respective name service provider servers, of which the NSP server 1 is one.

In this embodiment, the NSP server 1 combines both name service provider functionality and registrar functionality, although these two functionalities are in fact logically separable. The registrar functionality provides an interface between a customer and the registry 3 enabling the customer to register a domain. The name service provider functionality maintains zone data associated with the registered domain. For the .Tel domain, the zone data stored by the NSP server 1 for a registered .Tel domain includes contact information identifying various electronic communication identifiers associated with the owner of the .Tel domain.

The role of the sponsoring organisation is to further the interests for the users of the sponsored top-level domain, which are sometimes referred to as the Sponsored TLD Community. The sponsoring organisation formulates policy and provides a forum for user discussion. The sponsoring organisation maintains the SO server 5 to further these aims, and so to support the community members.

The registered user terminals 7 and the guest user terminals 9 may be conventional personal computers (PCs), workstations, mobile telephones and the like. The common feature of these devices is that they have a network connection allowing Internet access. For ease of explanation, this embodiment will discuss an exemplary registered user terminal 7 and an exemplary guest user terminal 9 which are both PCs. The registered user terminal 7 and the guest user terminal 9 both store a novel client program for use with the present invention.

In this embodiment the sponsoring organisation also supports an added-value service which allows a registrant of a .Tel domain to control access to the Universal Resource Identifiers stored in the corresponding zone data files. In this added value service, the registrant of a .Tel domain is able to assign a restricted status to some of the contact information associated with the registrant. Access to these electronic communication identifiers is only allowed with the express permission of the registrant.

In this embodiment, in order to get permission to view the restricted electronic communication identifiers a party sends, via the sponsoring organisation, a request to the registrant asking for access to the private communications contacts for that registrant. If the registrant approves the request, then the registrant sets up a sub-domain specific to the requesting party and stores electronic communication identifiers encrypted using a public key associated with the requesting party in the zone data for the sub-domain. The registrant then sends the requesting party the identity of this sub-domain. In this way, the requesting party is able retrieve the encrypted data and to recover the electronic communication identifiers using the private key which is associated with the requesting party.

In this embodiment, the sponsoring organisation stores for each user a copy of the private key(s) used to decrypt data that is made available to them. This allows a user to recover encrypted electronic communication identifiers for which access has been granted using an unmodified computer (i.e. one that does not store these keys) by logging onto the SO server 5 and letting the SO server 5 perform the decryption on behalf of the user. Use of the stored private key for a user is password-controlled, and the sponsoring organisation maintains a database of password information in the password store 13.

In order to store encrypted electronic communication identifier information in the zone data for a sub-domain, this embodiment employs a novel modification of a NAPTR (Name Authority Pointer) record. This facilitates the integration of the present invention with conventional DNS processing.

Novel System Components

The main novel components of the network communication system will now be described in more detail.

The User Terminals

Figure 2:
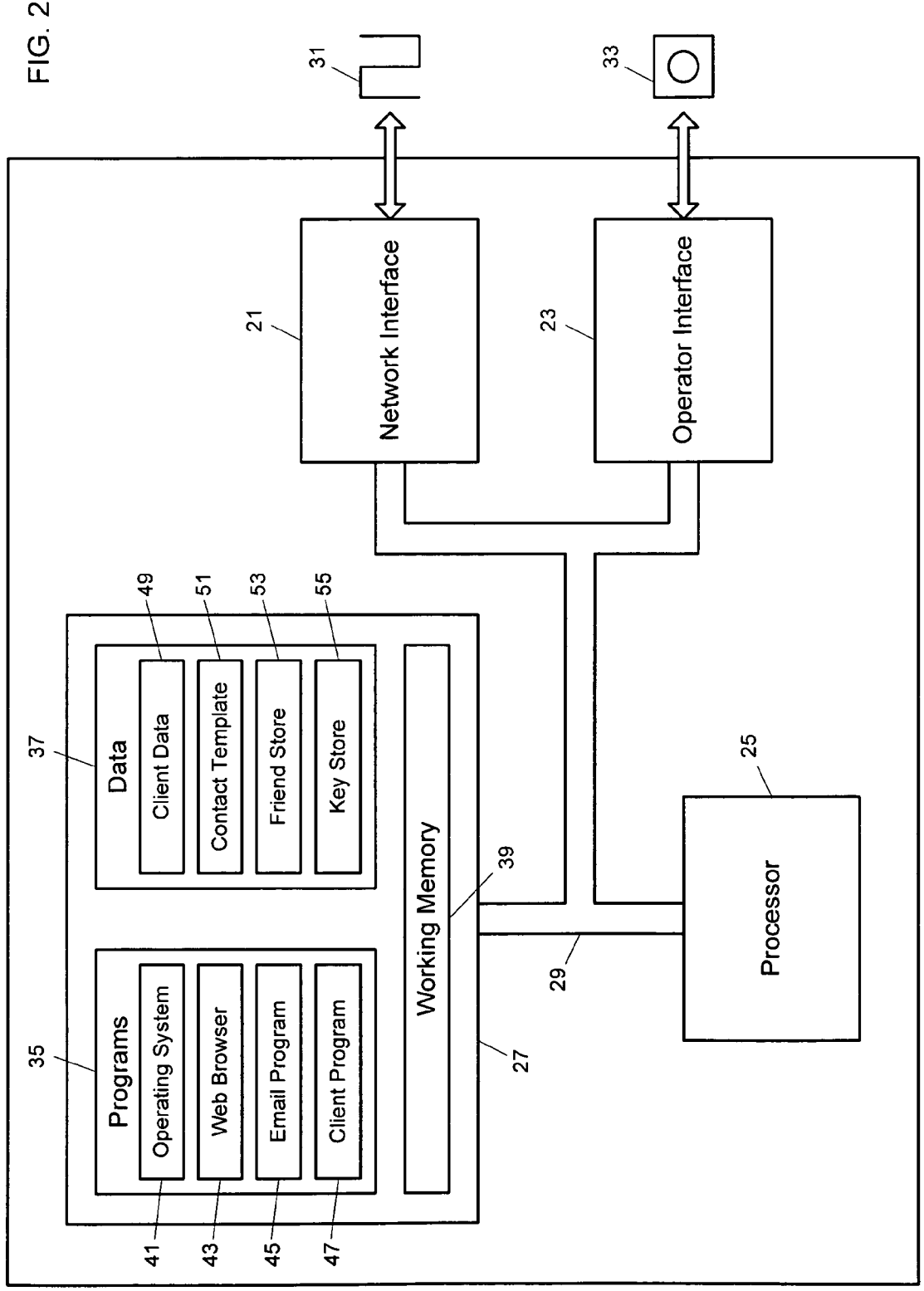
FIG. 2 schematically shows the main components of a user computer forming part of the communication system illustrated in FIG. 1.

In this embodiment, for both a registered user terminal 7 and a guest user terminal 9 the main components can be schematically represented by FIG. 2. As schematically shown, a network interface 21, an operator interface 23, a processor 25 and memory 27 are interconnected by a bus system 29. It will be appreciated that there may be other components present, and also that each of the illustrated components could in practice be implemented by more than one device.

The network interface 21 allows communication of signals 31 between the user computer and other devices connected to the Internet. In this way, data and/or instructions can be received by the user computer from a remote device, and the user equipment can send data and/or instructions to a remote device.

The operator interface 23 allows communication with a user, so that the user can input data and/or instructions, and receive data. As such, the operator interface includes a keyboard and a mouse device for entering data and instructions, and a display. In this embodiment, the operator interface 23 further includes a CD-ROM reader/writer which allows the user terminal to input data and instructions stored on a CD-ROM 33.

For ease of explanation, the memory 27 is schematically shown having three regions: a programs region 35, a data region 37 and working memory 39. It will be appreciated that in practice programs and data need not be stored in the memory 27 in such regions. It will also be appreciated that in practice the memory 27 is likely to be constituted by several different memory devices, each having different properties such as access times.

The programs memory region 35 stores the programs used by the user terminal. In this embodiment, these programs include an operating system 41 which controls the operation of the user terminal, a web browser program 43 which allows the user terminal to retrieve data from a remote web server, an email program 45 which allows email communication with a remote network apparatus, and a client program 47 which is used for the purposes of the present invention.

The data memory region 37 stores data which is used by the programs. The data memory region 37 includes client data 49 storing information about the account of the user with the sponsoring organisation, a contact template 51 storing network addresses associated with the user, a friend store 53 storing a list of domains to which access to restricted network addresses has been granted together with the corresponding sub-domains associated with the user, and a key store 55 storing the public and private keys of the user of the user terminal and public keys for other people.

Figure 3:
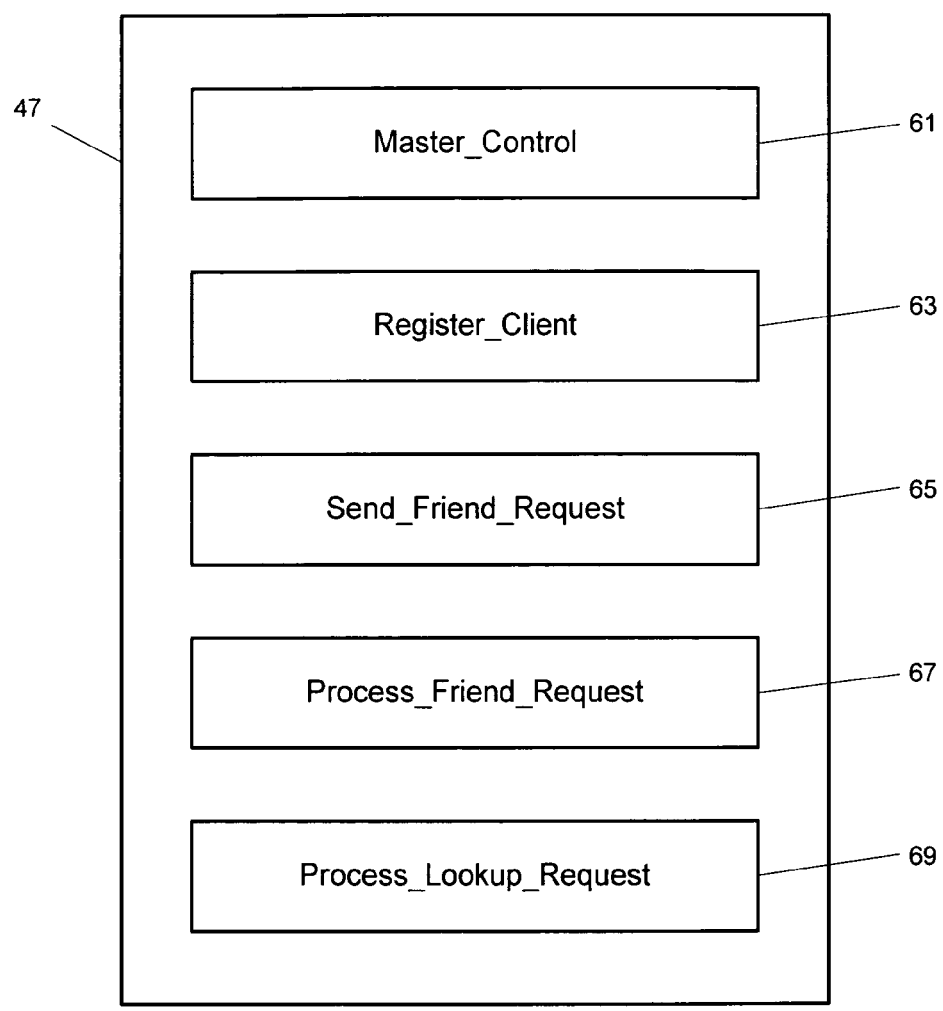
FIG. 3 schematically shows the contents of a client program stored on the user computer illustrated in FIG. 2.

The client program 47 may be downloaded as a signal 31 or read from a computer-readable device such as the CD-ROM 33. FIG. 3 shows the main routines of the client program 47. As shown, the client program 47 includes:

a Master_Control routine 61;

a Register_Client sub-routine 63 which is executed when the user enrols as a client of the sponsoring organisation;

a Send_Friend_Request sub-routine 65 which is used when the user requests access to the restricted contact information of another party;

a Process_Friend_Request sub-routine 67 which is used upon receipt of a request from another party for access to restricted contact information for the user; and a Process_Lookup_Request sub-routine 69 which is used when the user requests contact information from the .Tel domain for another party.

The information stored in the client data 49 includes an API-password for the user which is used by the client program 47 when interacting with the SO server 5.

In the key store 55, the private key for the user is stored in password-protected PKCS#8 file format.

The NSP Server

Figure 4:
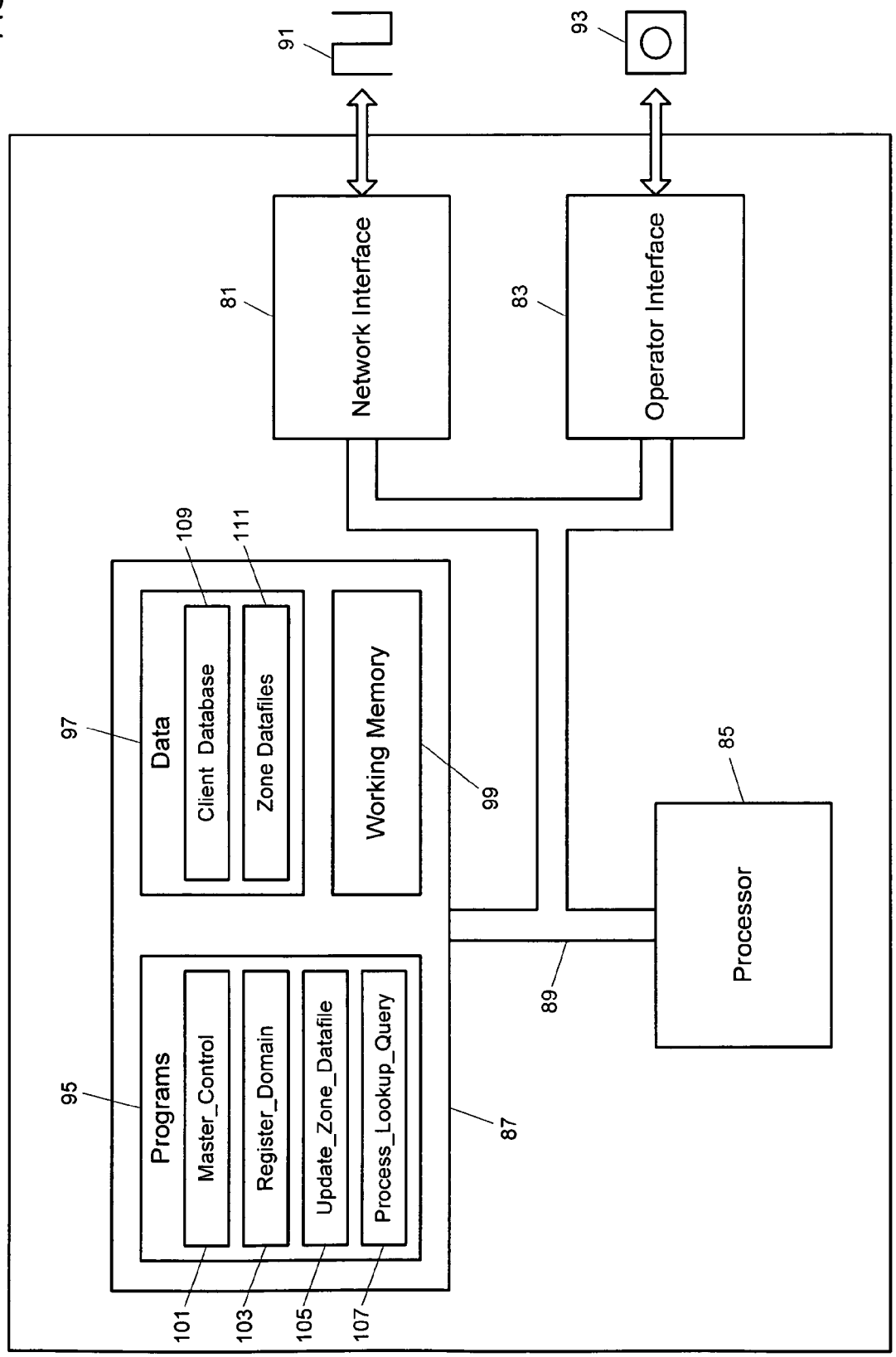
FIG. 4 schematically shows the main components of a name service provider server which is also associated with a registrar service and forms part of the communication system illustrated in FIG. 1.

As schematically shown in FIG. 4, the NSP server 1 has a network interface 81, an operator interface 83, a processor 85 and memory 87 interconnected by a bus system 89. It will be appreciated that there may be other components present, and also that each of the illustrated components could in practice be implemented by more than one device.

The network interface 81 allows communication of signals 91 between the NSP server 1 and other devices connected to the Internet. In this way, data and/or instructions can be received by the NSP server 1 from a remote networked device, and the NSP server 1 can send data and/or instructions to a remote networked device.

The operator interface 83 allows an operator to input data and/or instructions, and to view or otherwise export data. As such, the operator interface 83 includes a keyboard and a mouse device for entering data and instructions, and a display. In this embodiment, the operator interface 83 further includes a CD-ROM reader/writer which allows the NSP server 1 to input data and instructions stored on a CD-ROM 93.

For ease of explanation, the memory 87 is schematically shown having three regions: a programs region 95, a data region 97 and working memory 99. It will be appreciated that in practice programs and data need not be stored in the memory 87 in such regions. It will also be appreciated that in practice the memory 87 is likely to be constituted by several different memory devices, each having different properties such as access times.

The programs memory region 95 stores routines which are used by the NSP server 1 during operation. In particular, the routines stored in the programs memory region 95 include:

a Master_Control routine 101 which controls the operation of the NSP server 1;

a Register_Domain sub-routine 103 which is invoked when to set up a new domain;

an Update_Zone_Datafile 105 which is invoked when a domain owner grants access to restricted network addresses to another party; and a Process_Lookup_Query 107 which is invoked when a request for network address information is received.

The data memory region 97 stores a client database 109 storing username, domain name and password information for every client. The data memory region 97 also stores the zone datafiles 111 for the registered domains. The format of these zone datafiles will be discussed in more detail hereinafter.

The SO Server

Figure 5:
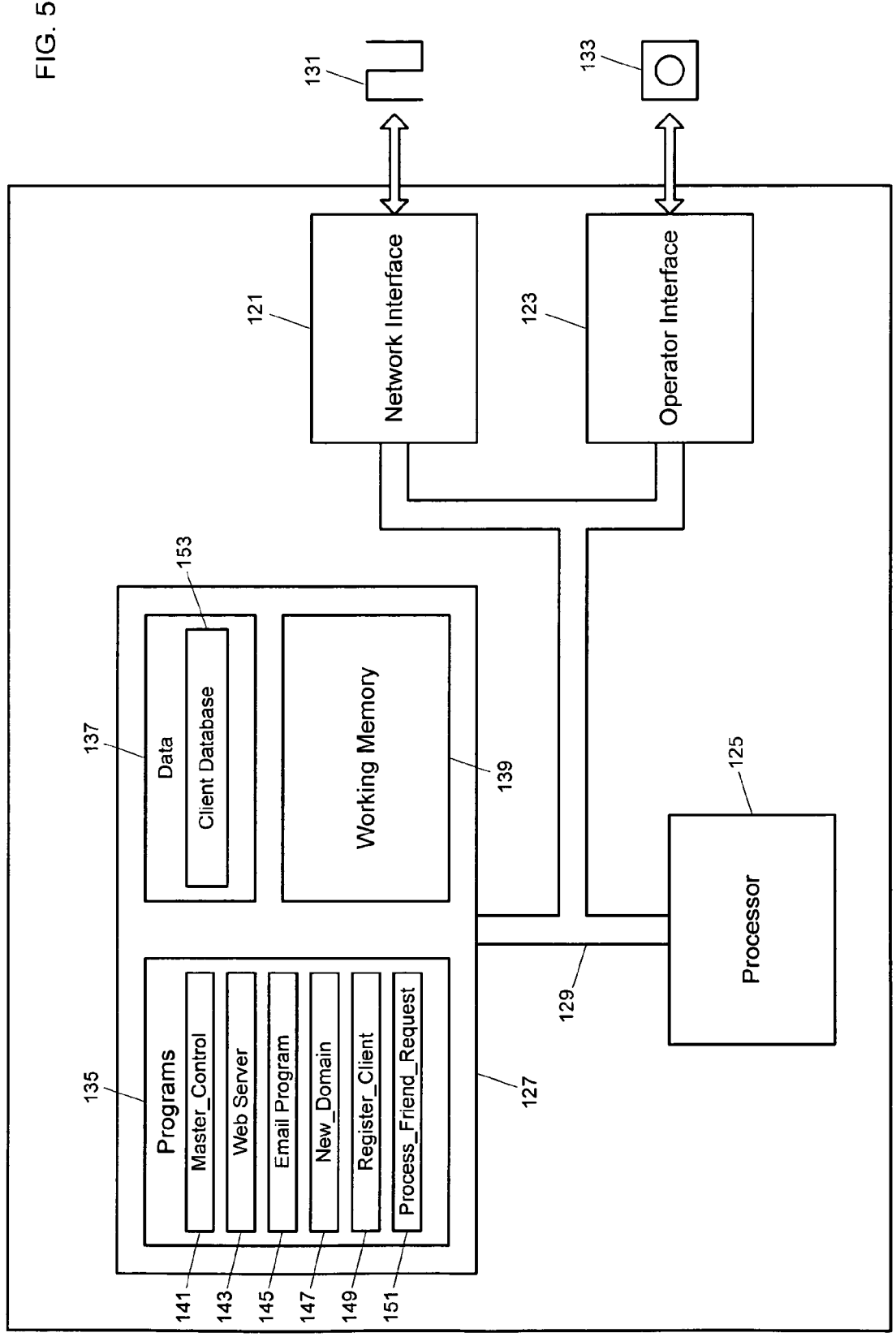
FIG. 5 schematically shows the main components of a server associated with a sponsoring organisation, the server forming part of the communication system illustrated in FIG. 1.

As shown in FIG. 5, the SO server 5 has a network interface 121, an operator interface 123, a processor 125 and memory 127 interconnected by a bus system 129. It will be appreciated that there may be other components present, and also that each of the illustrated components could in practice be implemented by more than one device.

The network interface 121 allows communication of signals 131 between the SO server 5 and other devices connected to the Internet. In this way, data and/or instructions can be received by the SO server 1 from a remote networked device, and the SO server 5 can send data and/or instructions to a remote networked device.

The operator interface 123 allows an operator to input data and/or instructions, and to view or otherwise export data. As such, the operator interface 123 includes a keyboard and a mouse device for entering data and instructions, and a display. In this embodiment, the operator interface 123 further includes a CD-ROM reader/writer which allows the SO server 5 to input data and instructions stored on a CD-ROM 133.

For ease of explanation, the memory 127 is schematically shown having three regions: a programs region 1355, a data region 137 and working memory 139. It will be appreciated that in practice programs and data need not be stored in the memory 127 in such regions. It will also be appreciated that in practice the memory 127 is likely to be constituted by several different memory devices, each having different properties such as access times.

The programs memory region 135 stores routines which are used by the SO server 5 during operation. In particular, the routines stored in the programs memory region 135 include:

a Master_Control routine 141 which controls the operation of the SO server 1;

a web server 143 which provides information to a web browser program of a remote networked computer in a conventional manner; and an email program 145 which sends electronic mail to, and receives electronic mail from, a remote networked computer in a conventional manner;

a New_Domain sub-routine 147 which is invoked when the SO server 5 is advised of the registration of a new .Tel domain;

a Register_Client sub-routine 149 which is invoked to register a new client; and a Process_Friend_Request sub-routine 151 which is invoked in response to receipt of a friend request for one of the registered clients.

The data memory 153 stores data including a client database 153 which stores details of all the clients of the sponsoring organisation. In this embodiment there are four types of client, namely a temporary client, a full client, a declined client and a guest client. Temporary client status is assigned to a registrant of a new .Tel domain (where the registrant is not recognised as an existing client) prior to that registrant being invited to register as a client with the sponsoring organisation. When a new registrant of a .Tel domain who is already at least a guest client associates that registered domain with his/her current account with the sponsoring organisation, the registrant becomes a full client. Registration with the sponsoring organisation is not, however, obligatory and if a new registrant of a .Tel domain declines to register with the sponsoring organisation then the new registrant is termed a declined client. Finally, guest client status is assigned to parties who do not own a .Tel domain but who wish to obtain access to restricted contact information in a .Tel domain owned by another party.

Figure 6D:
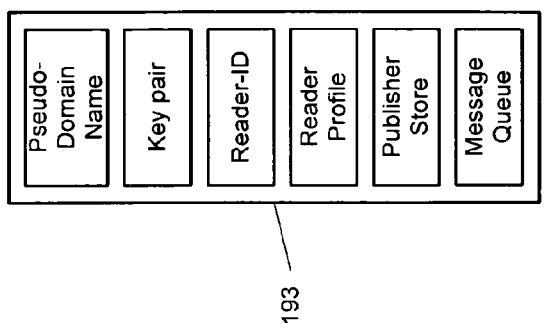
FIG. 6D schematically shows the content of an entry for a guest account stored in a database forming part of the sponsoring organisation server illustrated in FIG. 5.
Figure 6C:
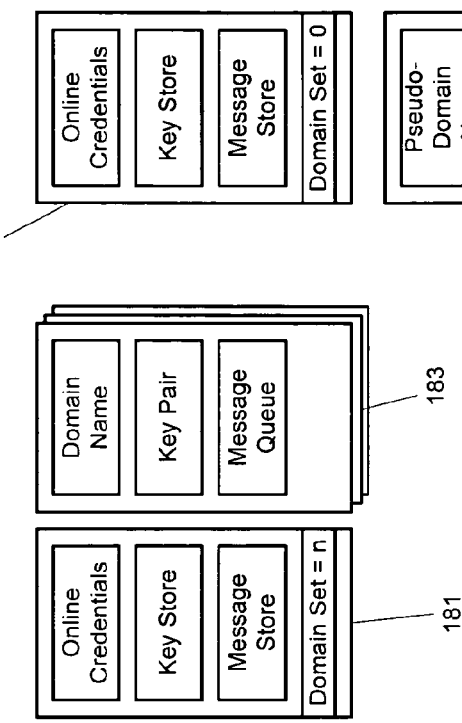
FIG. 6C schematically shows the content of an entry for a declined account stored in a database forming part of the sponsoring organisation server illustrated in FIG. 5.
Figure 6B:
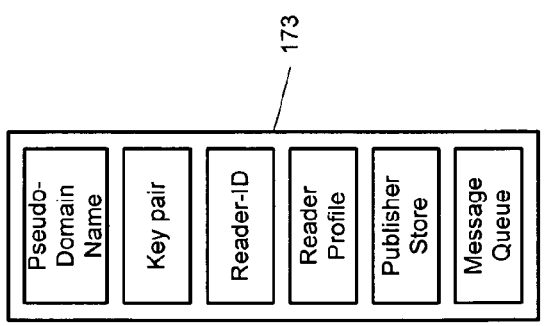
FIG. 6B schematically shows the content of an entry for a full account stored in a database forming part of the sponsoring organisation server illustrated in FIG. 5.
Figure 6A:
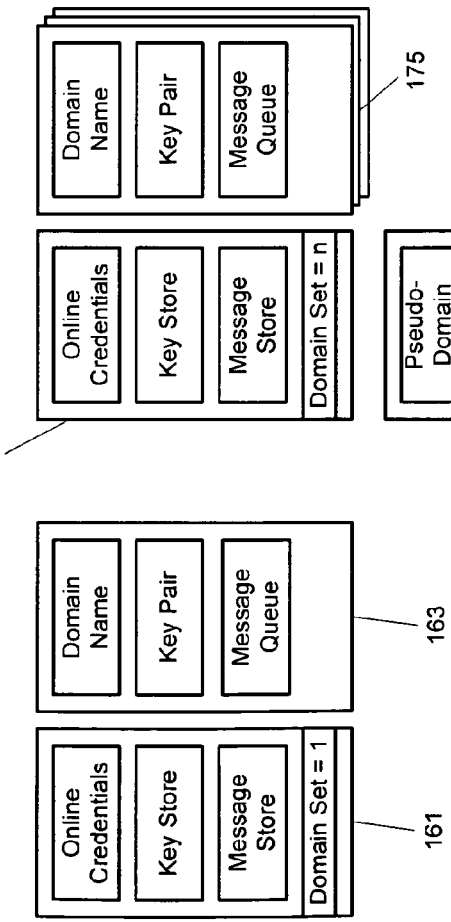
FIG. 6A schematically shows the content of an entry for a temporary account stored in a database forming part of the sponsoring organisation server illustrated in FIG. 5.

As shown in FIG. 6A, the data stored in a temporary client account includes user data 161 and publisher facet data 163. As shown in FIG. 6B, the data stored in a full client account includes user data 171, reader facet data 173 and publisher facet data 175. As shown in FIG. 6C, the data stored in a declined client account includes user data 181 and publisher facet data 183. As shown in FIG. 6D, the data stored in a guest client account includes user data 191 and reader data 193.

As can be seen from FIGS. 6A to 6D, the format of the user data for all accounts is identical (although all of the user data need not necessarily be present depending on the type of account). The user data includes online credentials, a key store storing cryptographic keys associated with the account, a message store storing messages associated with the account and a data field storing the number of domains registered for the account. In this embodiment, the online credentials include:

a username which uniquely identifies the account owner to the sponsoring organisation;

a web-password which is used to verify the identity of the account owner to the sponsoring organisation;

an api-generator which is a pseudo-random number generated by the sponsoring organisation for the user which is not exported by the sponsoring organisation;

security challenge data in the form of a question and answer which is used to provide secondary verification of the identity of the account owner to the sponsoring organisation; and a temporary personal identification number (PIN) which is used when the domain owner is invited to register with the sponsoring organisation.

In this embodiment, the public keys in the key store are published within the DNS domain keys.tel access to which is furnished by the DNS server 143, in a manner which will be described in more detail hereafter. This enables remote networked devices to access the public key information.

Each publisher facet is associated with a different .Tel domain. As can be seen from FIGS. 6A to 6C, the format of the data stored in each publisher facet is identical (although all of the data for a publisher facet need not be present). In particular, each set of publisher facet data includes data fields for storing:

the .Tel domain name corresponding to the publisher facet;

a key pair associated with the publisher facet, the key pair storing a public key and a private key for an asymmetric encryption algorithm; and a message queue storing messages for the account holder associated with the publisher facet.

Each reader facet is associated with the contact information retrieval by the account holder. As can be seen from FIGS. 6B and 6D, the format of the data stored in each reader facet is identical (although again all the data in a reader facet need not be present depending on the type of account). In particular, each set of reader facet data includes data fields for storing:

a pseudo-domain name associated with the account owner;

a key pair for the account holder which are used for reading operations;

a Reader_ID which is a unique number associated with the account holder;

a publisher store providing a "back-up" store holding the .Tel domain names of all the accounts for which the account holder has been granted access to restricted contact information; and a message queue storing messages for the account holder associated with the reader facet.

The public key which is used by the account holder for reading operations is stored in the sub-domain <pseudo-domain name>.so.keys.tel. The private key which is used by the account holder for reading operations is stored in a password protected PKCS#8 file.

It will be appreciated that the data in the message store is gleaned from the messages passed to the queues of the different facets for this account. In effect, the message store holds pointers to the messages held in the reader and publisher facets.

Operational Procedures

The manner in which the components of the network communication system interact with each other will now be described for the main operations performed by the network communication system. For ease of explanation, the description will consider the exemplary scenario where Alice registers the domain name Alice.tel, and Bob applies to have access to protected contact information for Alice.

New Domain Registration

In order to register the Alice.tel domain name, Alice contacts a registrar and indicates the desired .Tel domain name. The registrar sends an application to the registry 3 for registration of the Alice.tel domain name together with details of a corresponding NSP server 1. As discussed previously, in this embodiment the registrar also manages the NSP server 1. The registry 3 checks that Alice.tel has not already been registered, and if not registers Alice.tel and logs that signals addressed to a Uniform Resource Indicator (URI) identifying that domain name should be directed to the NSP server 1. If Alice.tel had already been registered, then the registry 3 would have advised the registrar accordingly, and the registrar would have advised Alice to request an alternative .Tel domain name.

In this embodiment, the client program 47 on Alice's computer utilises the Register_Client sub-routine 63 to store items of contact information in the contact template 51. Each item of contact information specifies an electronic communication identifier for Alice together with the appropriate communications protocol. The contact template includes a data field indicating which items of contact information should be made publicly available and which items of contact information should have restricted access. For example, Alice may store items of contact information for (1) contacting Alice by telephoning her work telephone, (2) contacting Alice by telephoning her cellular phone, (3) contacting Alice by sending an SMS message to her cellular phone, (4) sending a facsimile message to her work facsimile machine, and (5) sending an email to her email address, with items (1) to (3) being assigned by Alice as publicly available and items (4) and (5) being assigned by Alice as restricted access.

Alice specifies to the NSP server 1 the contact information which is to be provided in response to a query sent to Alice.tel. In particular, Alice instructs the NSP server 1 that if a party sends a query to Alice.tel then a signal is to be sent identifying items (1) to (3) of contact information.

On receiving the items of publicly available contact information, in this embodiment the NSP server 1 incorporates the items of contact information as NAPTR records within the zone datafile associated with Alice.tel. An example of the code employed to do so is as follows:

```
$TTL 86400
$ORIGIN alice.tel.
@   IN SOA bind.nsp-google.dns.tel sysadmin.nsp-google.tel (
    1139418938 ; serial
    3h ; refresh
    1h ; retry
    1w ; expire
    1h ) ; minimum
    IN NS bind.nsp-google.dns.tel.
@   IN A 172.16.30.13
;End user content follows
60 IN NAPTR 100 50 "u" "E2U+voice:tel+x-work"
"!^.*!tel:+441234567890!"
60 IN NAPTR 100 51 "u" "E2U+voice:tel+x-mobile"
"!^.*!tel:+447979797979!"
60 IN NAPTR 100 51 "u" "E2U+sms:tel" "!^.*!tel:+447979797979!"
```

In this embodiment, the NSP server 1 automatically provides information for Alice.tel, including a method for contacting Alice, to the sponsoring organisation.

Figure 7A:
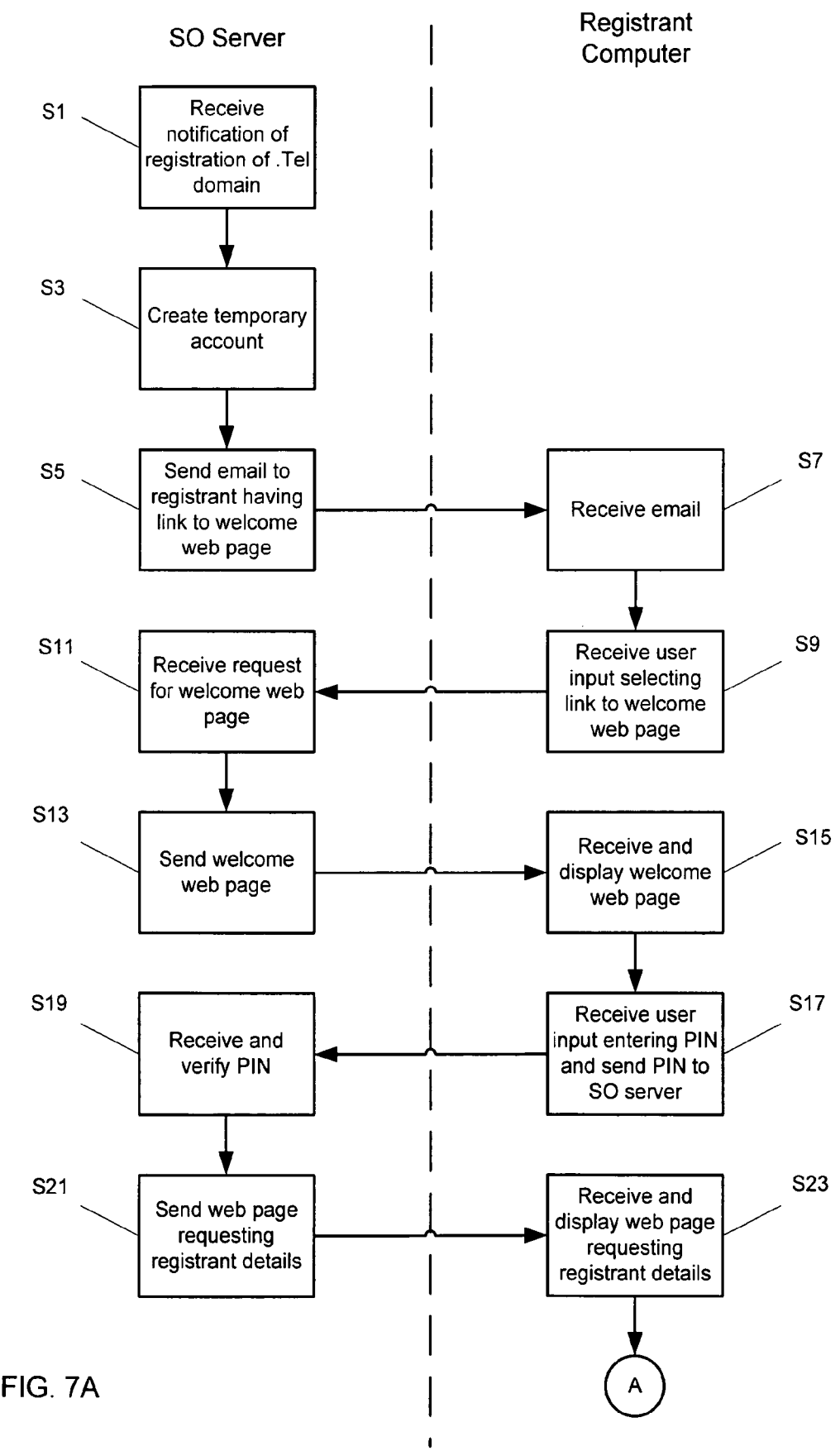
FIGS. 7A and 7B show a flow chart schematically illustrating the main steps involved in registering a domain with the sponsoring organisation.
Figure 7B:
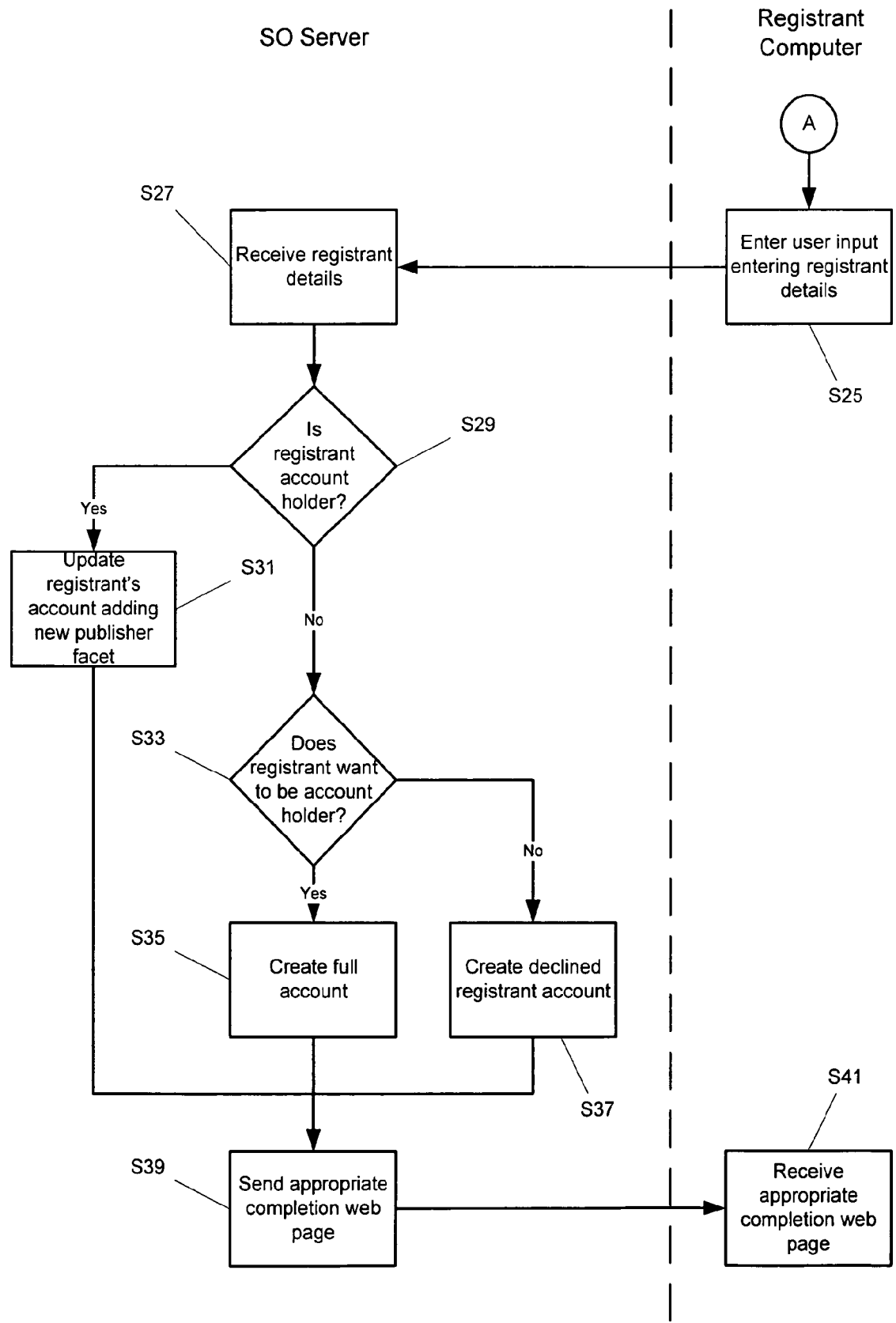

Turning now to FIGS. 7A and 7B, following receipt, at S1, of the notification of the registration of Alice.tel from the NSP server 1, the SO server 5 initiates the New_Domain subroutine 147 which creates, at S3, a temporary client account for Alice. In particular, the SO server 5 assigns a unique username to Alice and a PIN number and stores them in the online credentials, and generates a publisher facet for Alice.tel which at this stage only includes the domain name and the contact information provided by the NSP server 1.

The SO server 5 then sends, at S5, a welcome email to Alice. This welcome email includes a URI incorporating both the web address for a welcome web page and the username for Alice. The welcome email also includes the PIN. The SO server 5 then waits until the registrant of the new .Tel domain accesses the welcome web page.

Following receipt and opening, at S7, of the welcome email, and selection, at S9, of the URI for the welcome web page by Alice, Alice's computer sends a request for the welcome web page including the URI to the SO server 5. Following receipt, at S11, of the request, the web server 143 of the SO server 5 sends, at S13, the welcome web page to the Alice's computer. This welcome web page includes a data entry field for entering the PIN.

After receiving and displaying, at S15, the welcome web page, Alice's computer receives, at S17, an input from Alice entering the PIN in the appropriate data field. Alice's computer then sends this PIN to the SO server 5. Following receipt of the PIN, the SO server 5 verifies that the PIN matches that for the username contained in the URI, and then sends, at S21, a web page requesting registrant details. This web page includes a data field for indicating whether or not Alice already has an account with the sponsoring organisation, and also a data field for indicating whether or not Alice wants an account with the sponsoring organisation.

After receiving and displaying, at S23, the web page requesting registrant details, Alice's computer receives, at S25, inputs from Alice specifying the registrant details. Alice's computer then sends the registrant details to the SO server 5.

Following receipt, at S27, of the registrant details the SO server 5 checks, at S29 if Alice is already an account holder. If Alice is already an account holder, then the SO server 5 updates, at S31, Alice's existing account by adding a publisher facet for Alice.tel. This involves generating a public key and private key pair for the new domain, of which the private key is stored as a password-protected PKCS#8 file and the public key is made public in a sub-domain of the keys.tel database corresponding to the new domain name (e.g. for the domain Alice.tel the corresponding public key is available from the sub-domain Alice.keys.tel).

If Alice is not already an account holder, the sponsoring organisation checks, at S33, if Alice wants to be an account holder.

If Alice wishes to be an account holder, the SO server 5 converts, at S35, the temporary account into a full account. This involves completing the online credentials for the account holder and sending the api-password to the registrant computer for subsequent use by the client program. This also involves the generation and distribution of a public key and private key pair for Alice.tel in the manner described above.

If Alice did not wish to be an account holder, the SO server 5 converts, at S37, the temporary account to a declined account.

Finally, the SO server 5 sends, at S39, an appropriate registration complete web page to Alice's computer, which receives and displays, at S41, the completion web page.

New Friend Registration

For the specific example given above, Alice has restricted access to her email address and her work facsimile number. The process by which Bob gets access to this restricted contact information will hereafter be called 'friending'. If Alice grants Bob access to one or more items of restricted access contact information, then Bob is termed a 'friend' of Alice.

Figure 8A:
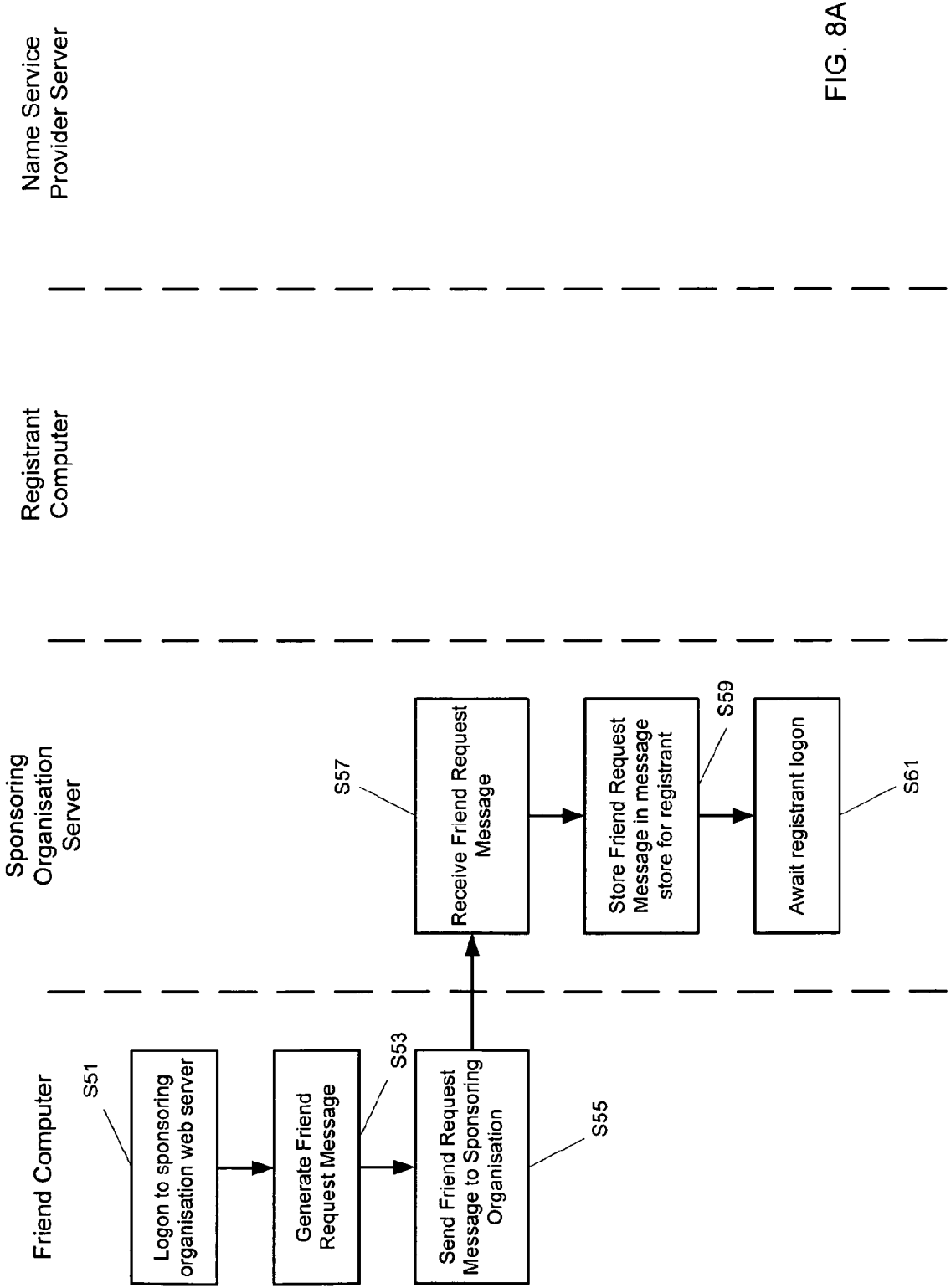
FIGS. 8A to 8C show a flow chart schematically illustrating the main steps involved when a party requests access to the network address information associated with a registered domain.
Figure 8B:
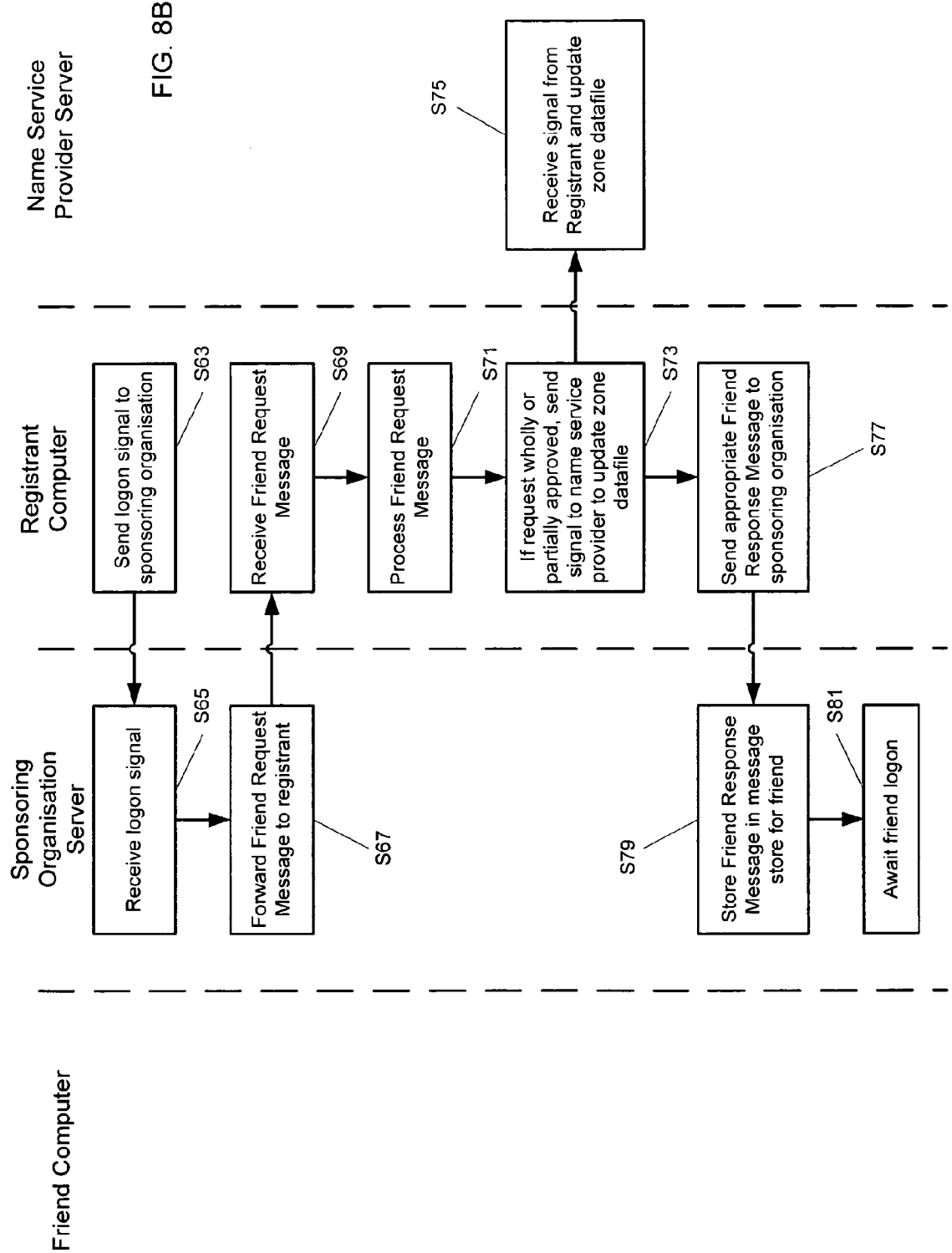
Figure 8C:
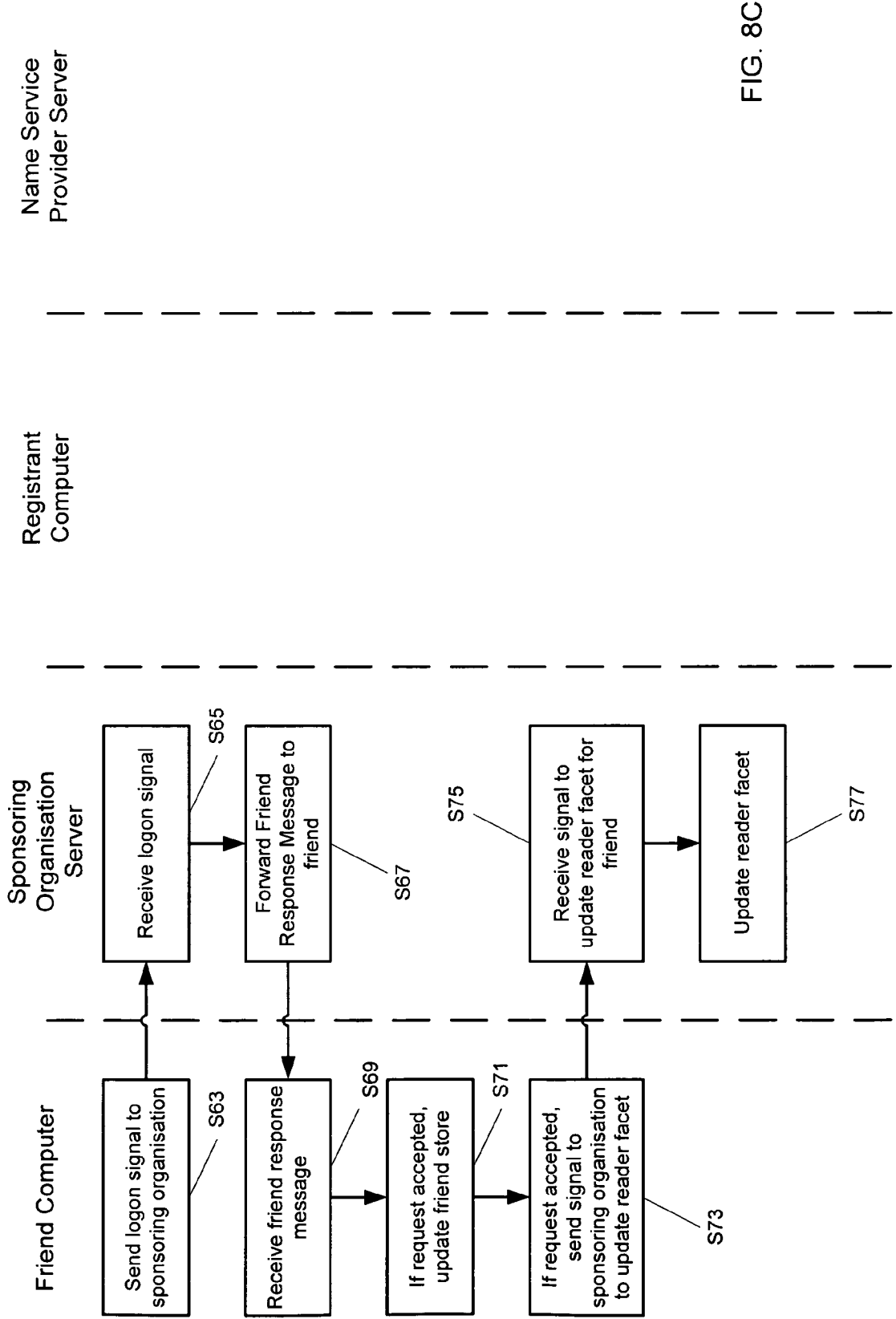

The process by which Bob becomes a friend of Alice will now be described with reference to FIGS. 8A to 8C. The process starts with Bob logging on to the sponsoring organisation server 5. If Bob is already has an account at the sponsoring organisation server 5, then Bob logs onto the existing account using the username and web password. If, however, Bob does not already have an account then Bob has to open a guest account. This involves Bob being assigned his own username and the setting of a web password. The SO server 5 also generates and stores an api-generator and a secondary security question and answer in the online credentials for Bob.

A reader facet is also generated for Bob including a pseudo-domain name and a private key and public key pair. In this embodiment, the pseudo-domain name used for reading operations by the account holder is simply the username. In this embodiment, the SO server 5 generates the private key and public key pair, stores both keys in the reader facet, sends the private key to Bob and publishes the public key in the web sub-domain <username for Bob>.reader.keys.tel.

After Bob has registered and logged on, Bob generates, at S53, an Encrypted Signed Friend Request Message (hereafter referred to as an ESFRqM) using the Send_Friend_Request sub-routine of the client program 47. The original message contents contained in the ESFRqM may be of the form:

```
From: <Username for Bob>
To: Alice.tel
Date: Thu Mar 1 16:59:26 GMT 2007-04-09
ReaderID: <Bob's ReaderID>
Message-type: Friend Request
Cover-note: Hello Alice. It's Bob, we met down the pub. You told
me to join you here!
```

A SHA-1 digest of this message is then encrypted using the private key used for reading operations by Bob and appended to the message, and the entire resultant message is encrypted using the public key for Alice.tel (retrieved from Alice. keys.tel). As will be appreciated by those skilled in the art, by encrypting the message using the public key associated with Alice.tel means that access to the private key associated with Alice.tel (which is controlled by Alice) is needed to recover the original message contents. Further, having recovered the original message contents Alice is able to recover the public key used for reading operations by Bob from <username for Bob>.reader.keys.tel, and then use the encrypted SHA-1 digest to verify the contents of the message.

The ESFRqM is then sent, at S55 to the message queue at the sponsoring organisation server 5 for Alice.Tel. After receipt, at S57, of the ESFRqM, the ESFRqM is stored, at S59, in the message store for Alice.tel and then the process waits, at S61, for the next time Alice logs on.

The process recommences when Alice next sends, at S63, a login signal to the sponsoring organisation server 5. Following receipt, at S65, of the login signal, the SO server 5 forwards the ESFRqM to the computer of Alice.

After receipt, at S69, of the ESFRqM the computer for Alice processes, at S71, the ESFRqM. This involves decrypting the ESFRqM and verifying the message contents as discussed above, and displaying a prompt for Alice to indicate whether or not the friend request should be approved. In response to a user input from Alice indicating that the ESFRqM is approved, Alice's computer then displays the contact template to Alice together with prompts indicating which items of restricted access contact information for which Bob is to be granted access.

For items of restricted access content information for which Alice has granted Bob access, Alice will generate an encrypted NAPTR record. In particular, if in plaintext NAPTR format the electronic communication identifiers for the facsimile telephone message and the email address for Alice are:

```
60 IN NAPTR 100 52 "u" "E2U+fax:tel"
"!^.*$!tel:+441234567891!!".
60 IN NAPTR 100 53 "u" "E2U+email:mailto"
"!^.*$!mailto:alice@wonderland.co.uk!.
``` then Alice retrieves the public key for Bob from <username for Bob>.reader.keys.tel and encrypts the RRData (excluding the order and the) priority fields) in the NAPTR record (e.g. "u" "E2U+fax:tel" "!^.*$!tel:+441234567891!!".) using the retrieved public key for Bob and Base64 encodes the result. In more detail:

(1) The plaintext in the NAPTR record is processed with PKCS#1 or OAEP padding to provide extra protection against attack and to create a standard block size (in this embodiment 128 bytes).

(2) The plaintext is encrypted with the retrieved reader public key for Bob to obtain 128 bytes of binary data.

(3) The binary data is Base64 encoded so that the encrypted data can be stored in a NAPTR record without containing special characters.

The resultant encrypted NAPTR record is stored in the format:

```
60 IN NAPTR 100 55 "u" "E2U+voice:tel+x-crypto:0f53179a07"
"!^.*$!data:;base64,SywNBMr9n0gDfo+Yh6fY10y+FnqexHiduohXyTOqpLCM
UH6S7Pn6a0bJifeZWQVv7QVXK0wXECm3F5TsZnh5ekOXH5ksGo239axEf
wwldrVdlmb4meNKIbvSxEgp6WFc8YN3u02toktNIoECYJOpODrQC+Y6j/bgiE
eCMIiMU8=".
60 IN NAPTR 100 56 "u" "E2U+x-crypto:0f53179a07"
"!^.*$!data:;base64,YnpfjR9UC3+5vVfOcrpWYOgPK9U7c8VfPMAsaDLQIvpJ
5Z99OqENIVF0YOLiHME8utQxnZ/tGTO3aYog6dE18q7AyCfu0FXnR+UxThb
BeSLe55djCwQDWvLiL6ATxqGZre4zeLJY5ivSOIrRNuYxUh/bKWogN1JiTEn
V8Kkyco8=".
```

Alice's computer then sends a signal to the NSP server 1 instructing that the contact information for Bob should be placed in a sub-domain identified by the value of a moniker specific to Bob (i.e. <moniker>.Alice.tel. In this embodiment the moniker for Bob is a hex character string representation of the SHA-1 hash of the incoming ESFRqM. Accordingly, it may be of the form 'aabbccddeeff11223344556677889900ffeeddcc'.

In response to receiving, at S75, the instruction to add the sub-domain specific to Bob, the NSP server 1 modifies the zone datafile for Alice.tel to include the additional sub-domain. An example of the zone data illustrating this follows:

```
$TTL 86400
$ORIGIN alice.tel.
@    IN SOA bind.nsp-google.dns.tel sysadmin.nsp-google.tel (
     1139418938 ; serial
     3h ; refresh
```

-continued

```
    1h ; retry
    1w ; expire
    1h ) ; minimum
    IN NS bind.nsp-google.dns.tel.
@   IN A 172.16.30.13
;End user content follows
60 IN NAPTR 100 50 "u" "E2U+voice:tel+x-work" "!^.*!tel:+441234567890!"
60 IN NAPTR 100 51 "u" "E2U+voice:tel+x-mobile" "!^.*!tel:+447979797979!"
60 IN NAPTR 100 51 "u" "E2U+sms:tel" "!^.*!tel:+447979797979!"
;Bob's view
$ORIGIN aabbccddeeff11223344556677889900ffeeddcc
;Copy of global contacts for Bob's convenience
60 IN NAPTR 100 50 "u" "E2U+voice:tel+x-work" "!^.*!tel:+441234567890!"
60 IN NAPTR 100 51 "u" "E2U+voice:tel+x-mobile" "!^.*!tel:+447979797979!"
60 IN NAPTR 100 51 "u" "E2U+sms:tel" "!^.*!tel:+447979797979!"
;Bob-only contacts
   IN NAPTR  100  52  "u"   "E2U+voice:tel+x-crypto:0f53179a07"
"!^.*$!data:;base64,SywNBMr9n0gDfo+Yh6fY10y+FnqexHiduohXyTOqpLCM
UH6S7Pn6a0bJifeZWQVv7QVXK0wXECm3F5TsZnh5ekOXH5ksGo239axEf
wwldrVdlmb4meNKlbvSxEgp6WFc8YN3u02toktNloECYJOpODrQC+Y6j/bgiE
eCMIiMU8=".
   IN NAPTR  100  53  "u"   "E2U+x-crypto:0f53179a07"
"!^.*$!data:;base64,YnpfjR9UC3+5vVfOcrpWYOgPK9U7c8VfPMAsaDLQIvpJ
5Z99OqENIVF0YOLiHME8utQxnZ/tGTO3aYog6dE18q7AyCfu0FXnR+UxThb
BeSLe55djCwQDWvLiL6ATxqGZre4zeLJY5ivSOIrRNuYxUh/bKWogN1JiTEn
V8Kkyco8=".
```

Alice's computer then sends, at S77, an encrypted signed friend response message (hereafter called an ESFRsM) to the message queue in Bob's reader facet at the SO server 5. The original message contents in the ESFRsM could be in the form:

```
From: Alice.tel
Date: Mon Mar 5 15:34:17 GMT 2007
To: <username for Bob>
Message type: Friend Response
Cover-note: Yes Bob, I remember you. Have accepted you. Alice
Sub-domain ID: aabbccddeeff11223344556677889900ffeeddcc
```

A SHA-1 digest of this message is then encrypted using the private key associated with Alice.tel, and appended to the message, and the entire resultant message is encrypted using the public key for Bob (as retrieved from <username for Bob>.reader.keys.tel). As will be appreciated by those skilled in the art, encrypting the message using the public key associated with Bob means that access to the private key associated with Bob (which is controlled by Bob) is needed to recover the original message contents. Further, having recovered the original message contents Bob is able to recover the public key associated with Alice.tel from Alice.keys.tel, and then use the encrypted SHA-1 digest to verify the contents of the message.

On receiving the ESFRsM, the SO server 5 stores, at S79, it in the message store for Bob and then waits, at S81, for Bob to login.

When Bob sends, at S63, a login signal to the sponsoring organisation and the SO server 5 receives, at S65, the logon signal, the SO server 5 forwards, at S67, the ESFRsM to Bob's computer. After Bob's computer has decrypted and verified the message contents, if the request is accepted then the client program 47 updates, at S71, the friend store 53 in Bob's reader facet to include Alice.tel and the sub-domain of Alice.Tel storing the encrypted items of contact information for Bob. In addition, if the request is accepted then Bob's computer sends, at S73, a signal to the SO server 5 instructing the SO server 5 to add Alice.tel and the sub-domain of Alice-.tel storing the encrypted contact information for Bob in the publisher store of Bob's reader facet. On receipt, at S75, of this signal, the SO server 5 updates, at S77, the reader facet for Bob accordingly.

Contact Information Retrieval

In this embodiment, the contact information retrieval can be performed either from the computer hosting client program and friend store for an account holder, or from a different computer.

Figure 9:
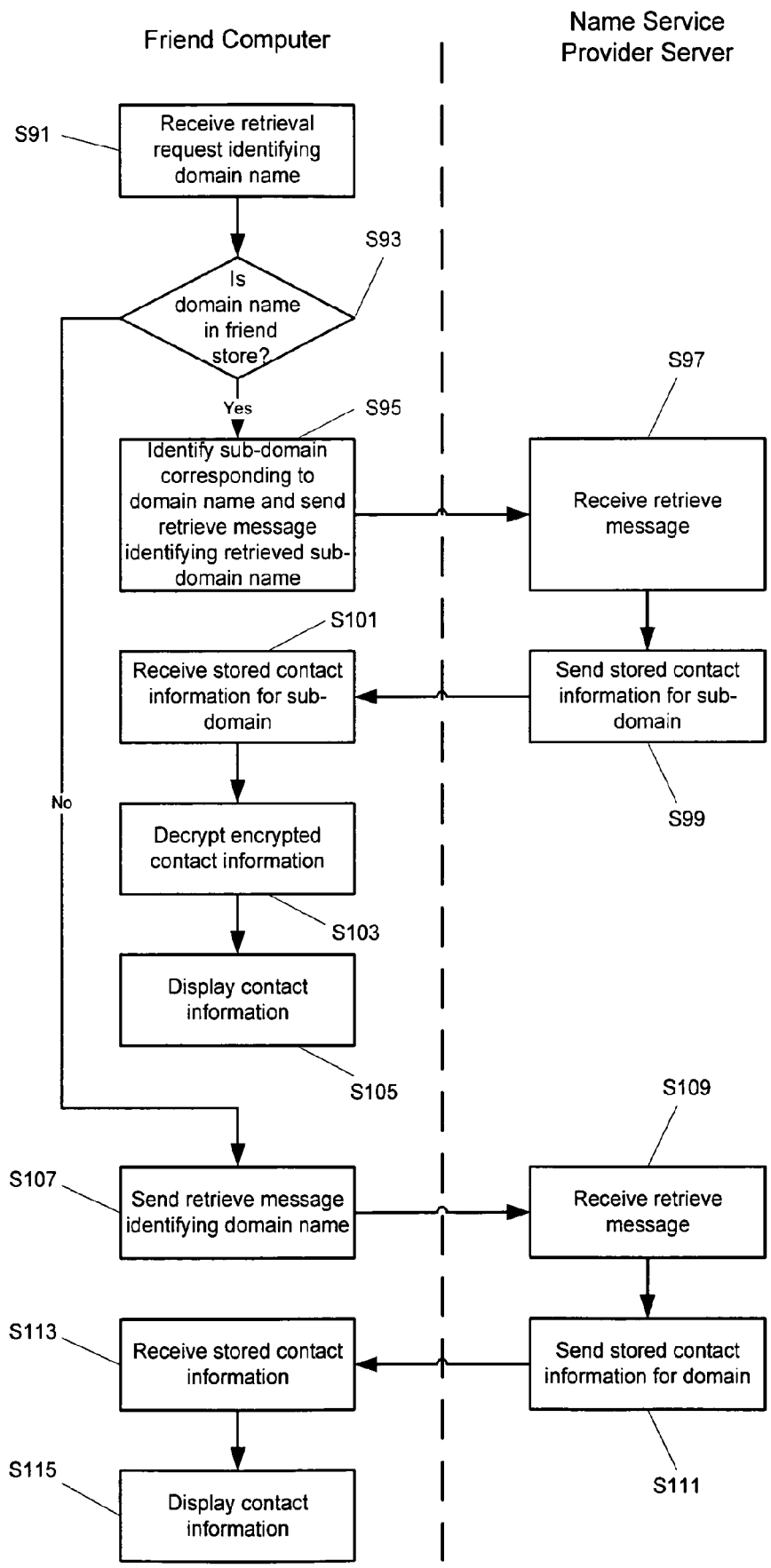
FIG. 9 shows the main steps performed when a party accesses a registered domain.

The case where the retrieval is performed from the computer hosting the client program and friend store for Bob for the scenario described above will now be described with reference to FIG. 9.

Firstly, Bob activates the client program 47 and enters the domain name for Alice, i.e. Alice .tel. Following receipt, at S91, the user input requesting contact information from Alice.tel, Bob's computer checks, at S93, to see if Alice.tel is listed in the friend store. If Alice.tel is listed in the friend store, then the client program 47 identifies, at S95, the sub-domain of Alice.tel storing encrypted contact information for Bob, i.e. aabbccddeeff11223344556677889900ffeeddcc.alice.tel, and then sends a look-up request signal to that sub-domain.

The look-up signal is directed to the NSP server 1 storing the zone data file for Alice.tel (or another computer storing a copy of the zone datafile) in a conventional manner. Following receipt, at S97, of the look-up signal, the NSP server 1 sends, at S99, the NAPTR records stored in the part of the zone datafile associated with the sub-domain to Bob. This includes the global unencrypted items of contact information and the encrypted items of contact information. Following receipt, at S101, of the items of contact information the client program decrypts, at S103, the encrypted items using the private key used by Bob for reading operations. The global contact items and unencrypted contact items are then displayed, at S105, to Bob.

If the requested .Tel domain is not listed in the friend store, then Bob's computer sends the look-up request to the identified domain name. For example, if Alice.tel was not in the friend store then the look-up request would be sent to Alice-.tel. Following receipt, at S109, of the look-up request, the NSP server 1 sends, at S111, the global unencrypted items of contact information stored in the part of the zone datafile associated with Alice.tel to Bob's computer. Following receipt, at S113, of the global items of contact information Bob's computer displays, at S115, the contact information to Bob.

In this embodiment, Bob's computer displays items of contact information together with respective links via which Bob can select to initiate a communication session with Alice using the network address and communications protocol associated with the item of contact information. For example, if Bob selects the link associated with the email address for Alice, Bob's computer opens the email program and displays a new email template with Alice's email address already inserted in the 'To' field.

If Bob is not using the computer on which the client program and friend store for Bob are loaded, then Bob can still access contact information from Alice.tel through the SO server 5. First, Bob logs into the SO server 5 and then sends a signal to the SO server 5 requesting contact information for Alice.tel. The SO server 5 checks if Alice.tel is listed in the publisher store for Bob, and if it is, determines the corresponding sub-domain for Bob. The SO server 5 then sends a look-up request to the sub-domain, and the NSP server 1 (or another server storing the zone datafile for Alice.tel) returns the items of contact information in the NAPTR records back to the SO server 5. The SO server 5 then decrypts any encrypted items of contact information using the private key that Bob uses for reading purposes (which is stored in the reader facet for Bob), and sends the global items of contact information and the decrypted items of contact information to the computer on which Bob is working.

MODIFICATIONS AND FURTHER EMBODIMENTS

As previously discussed, the registrar functionality and the name service provider functionality are logically separable. Accordingly, the registrar functionality and the name service provider functionality could be provided by separate servers.

In the described embodiment, contact information is stored in the zone data for a .Tel domain. It will be appreciated that the invention can also be implemented using zone data relating to other top level domains.

Storing the protected contact information for a 'friend' in a sub-domain which is unique to that friend provides a convenient mechanism by which the friend can access the appropriate protected contact information using existing DNS technology.

In the described embodiment, public keys are published within the DNS domain keys.Tel which is associated with the sponsoring organisation. While this is a convenient way of publishing the public keys, it will be appreciated that any mechanism by which public keys are generally accessible could be employed.

The described embodiment employs asymmetric encryption. Any asymmetric encryption algorithm could be used, for example the RSA algorithm. In the described embodiment the generation of a private key and public key pair takes place at the SO server. It will be appreciated that alternatively the private key and public key pair could be generated at the user computer and then the public key and, if desired, the private key are then sent to the SO server.

As discussed above, in an embodiment contact information may be retrieved using the client program or via the SO server. A disadvantage of retrieving information via the SO server is that the SO server needs access to the appropriate private key, thereby putting the security of that private key outside of Bob's direct control. In an alternative embodiment, the functionality enabling retrieval of contact information via the SO server is removed. This removes the need for the SO server to store the private key.

The embodiment described with reference to the drawings comprises computer apparatus and involves processes performed in the computer apparatus. The invention also extends to computer programs, particularly computer programs on or in a carrier, adapted for putting the invention into practice. The program may be in the form of source code, object code, a code intermediate to source code and object code such as in partially compiled form, or in any other form suitable for using in the implementation of the processes according to the invention.

The carrier may be any entity or device capable of carrying the program. For example, the carrier may comprise a storage medium, such as a ROM, for example a CD-ROM or a semiconductor ROM, or a magnetic recording medium, for example a floppy disc or a hard disc, or an optical recording medium. Further, the carrier may be a transmissible carrier such as an electronic or optical signal which may be conveyed via electrical or optical cable or by radio or other means.

The carrier may be an integrated circuit in which the program is embedded, the integrated circuit being adapted for performing, or for use in the performance of, the relevant processes.

Although in the described embodiment the invention is implemented by software, it will be appreciated that alternatively the invention could be implemented by hardware devices or a combination of hardware devices and software.

The invention claimed is:

1. A communication system allowing communication over one or more communication networks, the communication system comprising:

a domain name server storing a zone data file for a domain associated with a first party, the zone data file including contact information associated with the first party, the contact information including a plurality of electronic communication identifiers associated with the first party with each electronic communication identifier being associated with a corresponding communication protocol;

an access granting system enabling the first party to grant a second party access to one or more of the plurality of electronic communication identifiers, said access granting system being operable to encrypt said one or more electronic communication identifiers to generate encrypted contact information, to store said encrypted contact information in the zone data file; and a network apparatus remote from said domain name server, the network apparatus comprising: means for retrieving said encrypted contact information from the zone data file; and means for decrypting said encrypted contact information to recover said one or more electronic communication identifiers associated with the first party, wherein said access granting system is arranged to encrypt said one or more electronic communication identifiers using a public key of an asymmetric encryption algorithm, said public key being associated with the second party, and said network apparatus is arranged to decrypt said encrypted contact information using a private key corresponding to said public key, wherein the access granting system is further operable to store the encrypted contact information in association with a sub-domain of the domain, said sub-domain being associated with the second party, and to provide the second party with access to the identity of said sub-domain, and wherein the network apparatus is operable to retrieve the encrypted contact information from the part of the zone datafile associated with said sub-domain, the network apparatus comprising a database storing a plurality of domain names, wherein for each domain name, the database is configured to store a corresponding sub-domain, and wherein, in response to user input of a domain name, the network apparatus is arranged to check the database to determine if the input domain is listed in the database and, in the event that the input domain is listed in the database, to identify from the database the sub-domain corresponding to the input domain name and to send a request for contact information identifying the corresponding sub-domain.

2. A communication system according to claim 1, wherein the network apparatus further comprises means for receiving a user selection of one of said one or more electronic communication identifiers; and means for initiating communication with the first party in accordance with said selected electronic communication identifiers.

3. A communication system according to claim 1, wherein the encrypted contact information is stored in the form on one or more Name Authority Pointer records.

4. A communication system according to claim 1, wherein contact information is asymmetrically encrypted using a public key associated with the second party, and the encrypted contact information is decrypted using a private key associated with the second party.

5. A communication system according to claim 4, wherein said public key is published in a zone data file.

6. A communication system according to claim 1, wherein the access granting system comprises a server operable to store account information for the first party and the second party.

7. A communication system according to claim 1, wherein at least one electronic communication identifier is in the form of a Universal Resource Identifier.

\* \* \* \* \*